United States Patent [19]

Higuchi

[11] Patent Number: 4,508,362
[45] Date of Patent: Apr. 2, 1985

[54] PASSIVE SEAT BELT DEVICE

[75] Inventor: Kazuo Higuchi, Saitama, Japan

[73] Assignee: Honda Giken Kogyo Kabushiki Kaisha, Tokyo, Japan

[21] Appl. No.: 495,250

[22] Filed: May 17, 1983

[30] Foreign Application Priority Data

May 19, 1982 [JP] Japan ................................. 57-84287

[51] Int. Cl.³ .............................................. B60R 21/10
[52] U.S. Cl. ................................... 280/804; 280/802; 297/469; 297/473
[58] Field of Search ................ 280/802, 804; 297/469, 297/473

[56] References Cited

U.S. PATENT DOCUMENTS 4,249,756 2/1981 Schwanz et al. ................... 280/804
4,317,584 3/1982 Takata ................................ 297/469
4,382,614 5/1983 Kubota ............................... 297/469

Primary Examiner—Richard A. Bertsch
Attorney, Agent, or Firm—Lyon & Lyon

[57] ABSTRACT

A passive seat belt device having a seat belt with both ends attached to a vehicle body, directly or indirectly with at least one seat belt end connected to a seat belt wind-up retractor. A powered guide member on a track or pivoting arm at the center of the vehicle guides the seat belt in the longitudinal direction of the vehicle between forward and rearward positions for either releasing or loading the seat belt, respectively, for the occupant. A switching circuit is provided in association with the guide member and other vehicle levers, such as the gear shift or hand brake, which functions to stop the movement of the guide member whenever such a lever is in a position to interfere with the forwardly moving path of the guide member.

7 Claims, 10 Drawing Figures

PASSIVE SEAT BELT DEVICE

The present invention relates to a passive seat belt device and more particularly to a passive seat belt device capable of preventing interference between a belt guide member of the seat belt device and a gear shift lever, hand brake, or the like.

In recent years it has widely been known how important it is for a passenger to wear a seat belt in a passenger car, and in view of this importance there have been proposed various types of passive seat belt devices that do not require the driver or passenger to perform any act, such as buckling, to operate efficiently. A passive seat belt device, which restrains and protects the the human body automatically, is provided with a mechanism for operating the seat belt. According to this mechanism, when a person opens a vehicular door and sits on the seat, these motions are detected by a detector, whereupon a drive unit is operated to fit the person with the seat belt automatically. Release of the seat belt is also performed automatically under a predetermined condition.

One example of such passive seat belt device is a device of the type in which a belt guide member slides forward and back. This type of passive seat belt device is provided with a windup type seat belt, one end of which is fixed to a vertical rear frame of a vehicular door and the other end of which is wound up into a rectractor disposed at a rear part of the inside edge of a seat. The seat belt is passed through a hole in the guide arm provided for reciprocating motion along the inside edge of the seat, and it is supported by the guide arm. The seat belt is brought into loaded and released states by reciprocating motions of the guide arm under predetermined conditions by means of a drive unit. In this case, when the seat belt is in its released state, the guide arm occupies a foremost position, while when the seat belt is in its loaded state for protecting the person in the seat, the guide arm occupies a rearmost position.

In this connection, in a manual gear change type passenger car there usually are disposed a shift lever and also generally a hand brake lever in an intermediate position between the separate or so-called bucket type front seats, and in certain operating positions of those levers the levers and the guide arm of the passive seat belt device may interfere with each other. Therefore, there arises the necessity of eliminating such inconvenience.

The above-mentioned problem can occur also in the case of various other types of passive seat belt devices mounted in passenger cars equipped with a manual gear change lever or hand brake lever and the present invention has been effective for solving that problem.

According to the present invention there is provided a passive seat belt device including a seat belt both ends of which are fixed to a vehicle body directly or indirectly, at least one of the two ends being connected to a seat belt wind-up unit, a guide member which guides the seat belt in the longitudinal direction of the vehicle body, and a drive means for driving the guide member, in which the loading and release of the seat belt for a passenger are performed by a longitudinally reciprocating motion of the guide member driven by the drive means. This device is provided with a switch means for stopping the movement of the guide member upon the occurrence of another member being interposed in the path of the forward movement of the guide member.

The present invention further provides a passive seat belt device including a seat belt with both ends fixed to a vehicle body directly or indirectly, at least one of the two ends being connected to a seat belt wind-up unit, a guide member which guides the seat belt in the longitudinal direction of the vehicle body at a nearly central area of the vehicle body, and a drive means for driving the guide member, in which the loading and release of the seat belt for a passenger are performed by a longitudinally reciprocating motion of the guide member driven by the drive means. In this device, under a predetermined certain condition a forward stop position in forward movement of the guide member is changed to a more rearward position as compared with that occupied in other than such predetermined condition.

It is an object of the present invention to provide a passive seat belt device having a guide arm which is adapted to be stopped in an appropriate position according to operating conditions of other vehicular devices to prevent the guide arm from interfering with component members of such other vehicular devices.

The above and further objects, details and advantages of the present invention will become apparent from the following description of preferred embodiments thereof when read in conjunction with the accompanying drawings.

Preferred embodiments of the present invention will be described in detail hereinunder with reference to the accompanying drawings.

Figure 1:
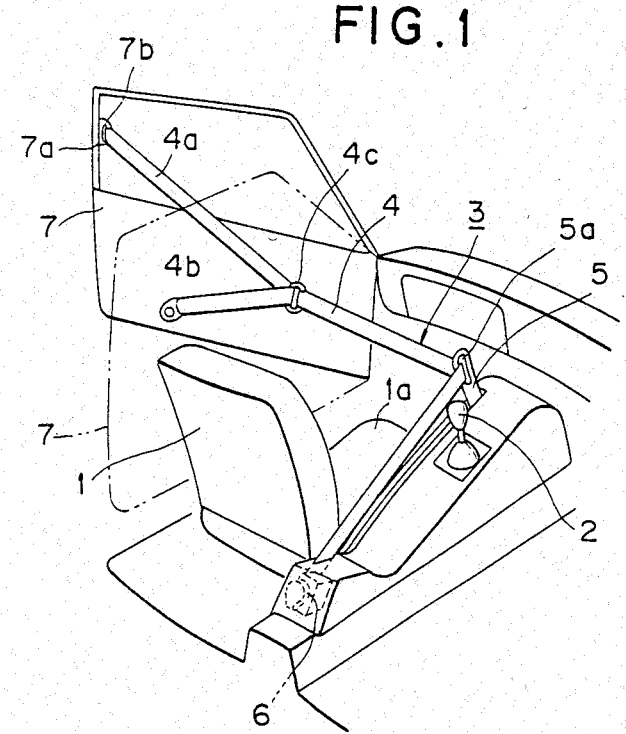
FIG. 1 is a perspective view showing the appearance from the vehicle interior of a passive seat belt device according to an embodiment of the present invention.

Referring first to FIG. 1, there is shown a front passenger's seat (i.e. in a right-hand drive car) and its surrounding portion viewed obliquely from the back in a passenger car to which is applied an embodiment of the present invention. The reference numeral 1 denotes the passenger's seat, and a manual shift lever 2 is provided between the passenger's seat 1 and a driver's seat (not shown). The passenger's seat 1 is equipped with a seat belt device, generally designated 3, of this invention. The construction and operation of the device of this invention are the same for the driver's seat and therefore only the illustrated device for the passenger's seat will be described.

The seat belt device 3, which is an automatic restraint type device called a passive seat belt device, has a function such that when a passenger sits on the seat 1 a seat belt is loaded automatically, and under a predetermined certain condition the loaded seat belt is released automatically. Thus, according to this device, the loading of the seat belt is effected independently of the passenger's will and without requiring any action, such as buckling the belt.

The seat belt device 3 is composed of a seat belt 4, a guide arm 5, a drive unit (not shown) for driving the guide arm, a belt retractor 6, detectors and a control circuit. In this embodiment, as shown in FIG. 1, a connection point between a shoulder belt portion 4a and a waist belt portion 4b of the seat belt 4 is inserted through a loop member 4c, and an end of the shoulder belt portion 4a is fixedly retained by a loop member 7b of a vertical rear frame portion 7a of a vehicular door 7, while an end of the waist belt portion 4b is fixed to a lower part of the vehicular door 7. Another portion of the seat belt 4 is secured to and extends from the loop member 4c to and through a slot shaped hole 5a formed in the guide arm 5 and then its end portion is fixed in a wound-up state to the retractor 6 mounted at a rear part of the inside edge of a cushion 1a of the seat 1. The seat belt 4 is a conventional wind-up type seat belt that can be drawn out slowly from the retractor 6 but is locked when pulled rapidly.

As mentioned above, the seat belt 4 is guided and supported by the hole 5a of the guide arm 5 at the intermediate point on the way to the retractor 6. The guide arm 5 has a base portion 5b which is supported by a guide rail 8 mounted along the inside edge of the cushion 1a of the seat 1, and driving power is applied to the base portion 5b through any conventional power transmission and drive unit means, illustrated diagrammatically as "D", so that the guide arm 5 can reciprocate along the guide rail 8. In this case, the direction of movement of the guide arm 5 depends upon outputs of the detectors. To give an example of its operation, when the door 7 is opened, the guide arm 5 moves (advances) from its rearmost position B up to its foremost position A thereby allowing the seat belt 4 to occupy a release position thereof, while, conversely, when the door 7 is closed, the guide arm 5 moves (retracts) from its foremost position A to its rearmost position B thereby allowing the seat belt 4 to occupy a loaded position thereof. A detector is provided for the detection of opening and closing of the door 7. A separate detector is provided for causing the guide arm 5 to stop in the extreme forward or rearward positions of the guide arm following the aforesaid movement that was started automatically in response to the door opening and closing. Such detectors may be limit switches or the like.

In this manner seat belt 4 is loaded and released both automatically. The stop of the guide arm 5 at an intermediate point during advance or retract is caused by detection of its position through another detector dedicated for this purpose. In the normal case the guide arm 5 is stopped at its foremost position A in forward movement and at its rearmost position B in backward movement, and for this purpose a detector, e.g., a limit switch, is disposed in each of the foremost and rearmost positions. This arrangement is shown in FIG. 2, in which the numeral 9 denotes a limit switch for stopping the guide arm 5 at the foremost position A, and the numeral 10 denotes a limit switch for stopping the guide arm 5 at the rearmost position B, the limit switches 9 and 10 being turned on or off corresponding to whether or not a lower projection 5c in the vicinity of the base portion of the guide arm 5 presses movable portions of those limit switches.

Figure 2:
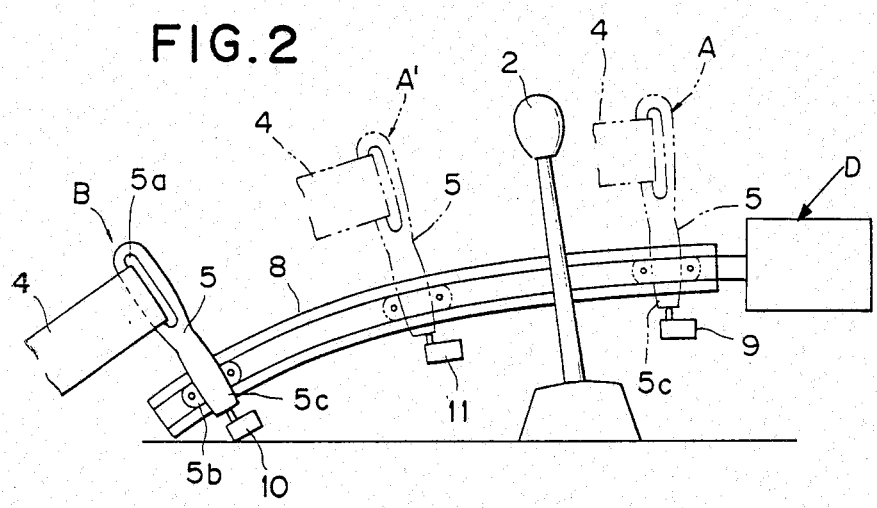
FIG. 2 is a side view showing an operating mechanism of a guide arm used in the embodiment illustrated in FIG. 1.

In the seat belt device according to the present invention, an additional limit switch 11 is disposed in an appropriate position between the foremost and rearmost positions, as shown in FIG. 2, and every time the guide arm 5 moves forward and backward along the guide rail 8 a movable portion of the limit switch 11 is pressed by the lower projection 5c of the guide arm 5 whereby the limit switch 11 is turned on and off. Whether the guide arm 5 is to be stopped or not during its movement is not exclusively determined by on-off state of the limit switch 11, but only in a specific case the guide arm 5 does not move up to its foremost position A and it stops at an intermediate position A' where the limit switch 11 is located.

Figure 3:
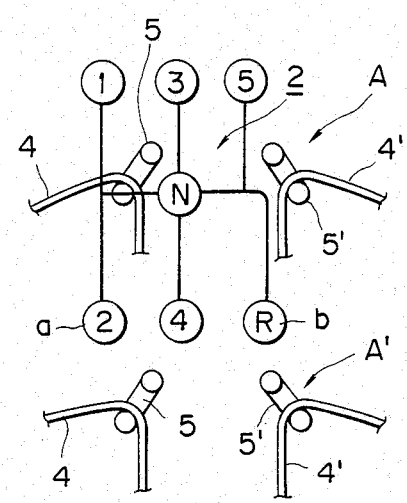
FIG. 3 is a diagramatic plan view for explaining an interfering relation between a shift lever and the guide arm in the embodiment illustrated in FIG. 1.

As shown in FIGS. 1 and 2, the manual shift lever 2 is disposed in a position adjacent to the guide rail 8, so that, for example, when the shift lever 2 is shifted to the position of a second gear "a", as shown in FIG. 3, the shift lever 2 will interfere with the forward movement of the guide arm 5. In this case, therefore, it is necessary to stop the guide arm 5 before it comes in contact with the shift lever 2 which is in the second gear position. Such a case occurs also between the guide arm mounted on the driver's seat side (in a right-hand drive car) and the shift lever 2 when the shift lever is in the position of a reverse gear "b", as shown in FIG. 3.

Figure 4:
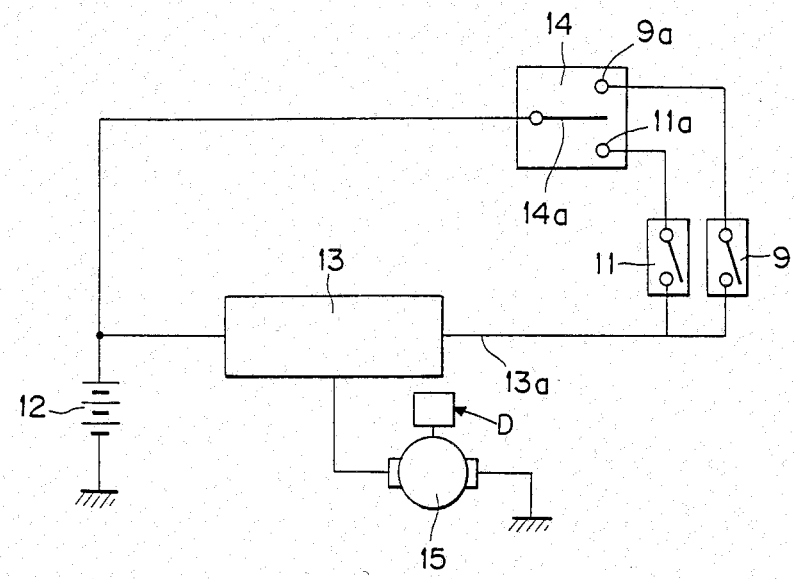
FIG. 4 is a diagram of an electric circuit for the embodiment illustrated in FIG. 1.

There is provided a circuit for stopping the guide arm 5 at the intermediate position in the above-described cases, and specifically the seat belt device is provided with an electrical circuit so that the intermediate stopping of the guide arm 5 is performed for the passenger's seat side only when the gear change lever 2 is in the position of second gear "a" and for the driver's seat side only when the gear change lever 2 is in the position of reverse gear "b". One such electric circuit is shown in FIG. 4, in which the numeral 12 denotes a battery and 13 denotes a control circuit. Between a signal input terminal 13a of the control circuit 13 and the anode of the battery 12 are interposed a change-over switch 14 and the limit switches 9 and 11. One end of each of the limit switches 9 and 11 is connected to the signal input terminal 13a, and the change-over switch 14 is provided for connecting the anode of the battery selectively to the other end 9a or 11a of each of the limit switches 9 and 11, respectively. As previously noted, the limit switch 9 is a foremost position stopping switch, while the limit switch 11 is an intermediate position stopping switch. Further, the change-over switch 14 operates in such a manner that a movable element 14a thereof is connected to the terminal 11a only when the change lever 2 is shifted to the position of second gear "a" or reverse gear "b", and in other cases the movable element 14a is connected to the terminal 9a. Therefore, when the change lever 2 is in the second gear position, the limit switch 11 is turned on by the lower projection 5c of the guide arm 5, whereupon a signal is applied to the input terminal 13a of the control circuit 13, whereby the supply of electric power to a motor 15 of a drive unit D for moving the guide arm 5 is stopped by the control circuit 13 and hence the guide arm 5 stops at the intermediate position A'. When the shift lever 2 is in any position other than the second and reverse gear positions, the motor 15 is not stopped even when the limit switch 11 is turned on and the guide arm 5 stops at the foremost position A.

Since two separate motors are provided, one for moving the guide arm of the passenger's seat belt and the other for the driver's seat belt, the control circuit 13 is constructed such that it is capable of controlling the operation of each of those motors respectively. One such motor is omitted in FIG. 4.

Figure 5:
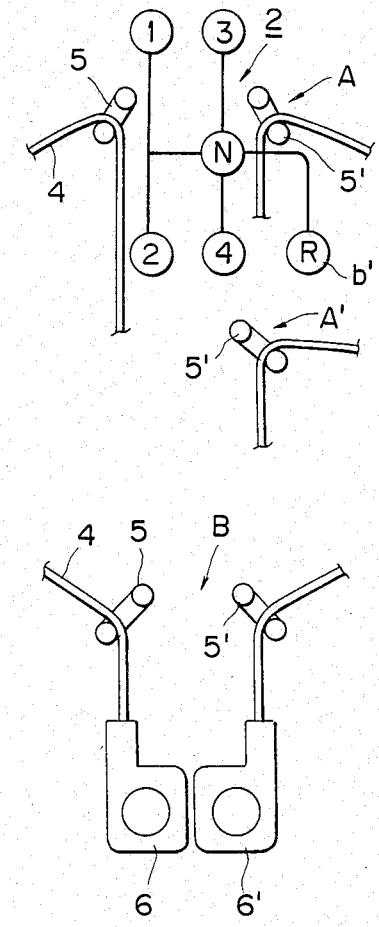
FIG. 5 is a view similar to FIG. 3 illustrating another embodiment of the present invention.

As shown in the embodiment of FIG. 5, the intermediate stopping switch may be required only on the driver's seat side with a four speed transmission wherein the shift lever 2 is positioned closer to the driver in which case the lever 2 should interfere only with the guide arm 5' on the driver's seat side and only when it is in the position of reverse gear b', whereby the guide arm 5' is stopped by an intermediate stopping limit switch disposed in a position before interference with the change lever 2 in the same way as described above. In this case, the change-over switch 14 is switched to the intermediate stopping limit switch side only when the change lever 2 shifts to the reverse gear position.

In FIGS. 3 and 5, the numerals 6 and 6' identify the retractors, 4 and 4' identify the seat belts, A is the foremost position, A' is the intermediate stop position; and B is the rearmost position.

Similarly, the change-over switch 14 may be operated according to the position of the lever for the parking brake (not shown). More specifically, the change-over switch 14 may be operated when either the parking brake lever is pulled up (brake on position) or the change lever is shifted to the position of reverse gear to cause the guide arm to stop at the intermediate position and avoid interfering with either lever.

Figure 6:
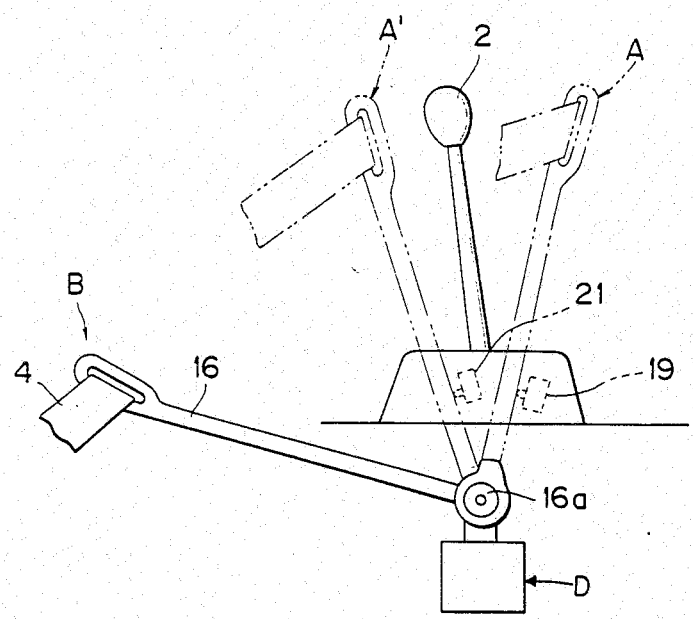
FIG. 6 is a view similar to FIG. 2 illustrating still another embodiment of the present invention.

Referring now to FIG. 6, there is shown still another embodiment of the present invention, in which the seat belt device is equipped with a pivotable guide arm 16 rather than a guide arm traveling along a track as described above. The numeral 2 again denotes a shift lever disposed between the driver's seat and the passenger's seat, and a guide arm 16 for the seat belt of each seat is provided adjacent to the shift lever 2. The guide arm 16 is rotated about a shaft 16a by a drive unit D. The letters A and B represent foremost and rearmost limit positions of the guide arm 16 respectively, and between those positions is an intermediate stop position A' rearwardly of the foremost position of the shift lever 2. The operation in this embodiment is the same as in the previous embodiment. In FIG. 6, the numerals 19 and 21 denote a foremost position stopping limit switch and an intermediate position stopping limit switch respectively, the limit switch 21 being disposed to the side so as not to physically prevent the movement of the guide arm 16. Similarly, as with the embodiment of FIG. 2, a limit switch (not shown) may be provided at the rearmost position of guide arm 16.

Figure 7:
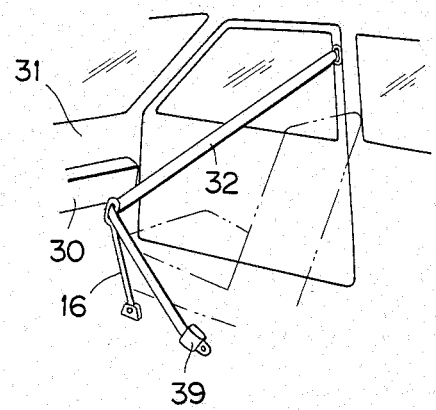
FIGS. 7 through 10 are perspective views each illustrating a schematic structures of a passive seat belt device in a still further embodiment of the present invention.
Figure 8:
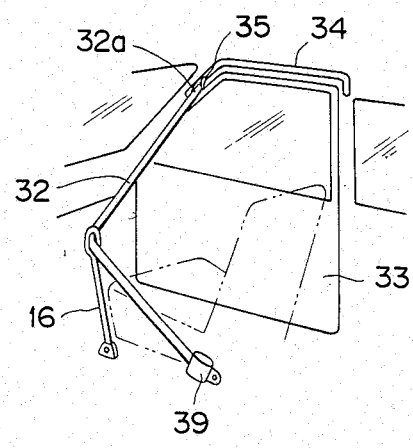
Figure 9:
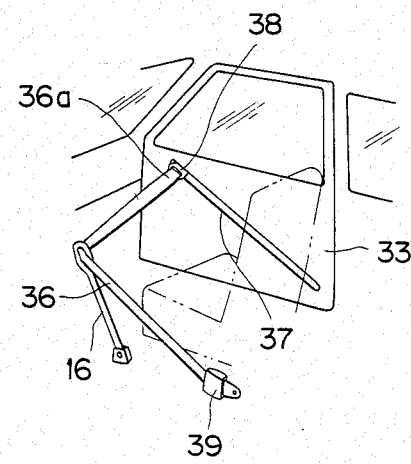
Figure 10:
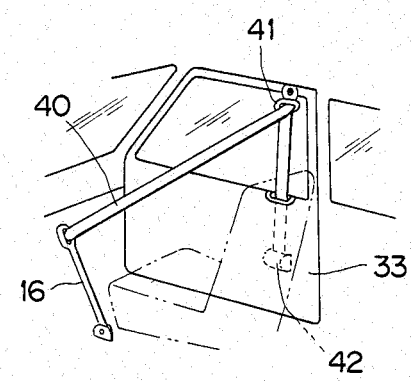

Several other embodiments or variations of the present invention will now be described with respect to the remaining Figures showing various other types of passive seat belt devices. More specifically, referring first to FIG. 7, there is shown a passive seat belt device of the type in which a knee pad 30 is provided below an instrument panel 31 and a shoulder belt 32 is guided by the pivotable guide arm 16 and with the belt 32 connected to the door at only one location. Referring to FIG. 8, there is shown a passive seat belt device of the type in which the upper end of the shoulder belt 32 is attached to a moving member 35 which is reciprocated by a motor or the like on a rail 34 mounted on an upper horizontal frame above the door 33 and an intermediate portion of the shoulder bolt 32 is guided by the pivotable guide arm 16. Referring to FIG. 9, there is shown a passive seat belt device of the type in which one end 36a of a waist belt 36 is fixed to a moving member 38 which is reciprocated by a motor or the like on a rail 37 attached to the inside body portion of the door 33 and an intermediate portion of the waist belt 36 is guided by the pivotable guide arm 16. In the above passive seat belt devices of the types shown in FIGS. 7 through 9, the vehicular center side ends of the belts 32 and 36 are wound up by retractors 39. Lastly, FIG. 10 illustrates a passive seat belt device of the type in which the vehicular center side end of a shoulder belt 40 is fixed to the upper end of the guide arm 16 and the other end thereof is inserted through a through ring 41 attached to the upper horizontal frame of the door 33 and then wound up into a retractor 42 mounted within the body of the door 33. In these modified types of passive seat belt devices, mechanisms are provided similar in operation and function to those of the previous embodiments, with a forward stop position A, a rearward stop position B, and an intermediate stop position A' for the guide arm 16.

According to the present invention, as will be understood from the above description, a passive seat belt device is equipped with a guide member reciprocating and guiding a seat belt between foremost and rearmost positions, the guide member can be stopped at an intermediate position between the foremost and rearmost positions under certain specific conditions, thereby preventing the guide member from interferring with component numbers or levers of other vehicular devices and a smooth operation of each of those devices is achieved. Further it is to be understood that the component members of other vehicle devices to be avoided are not limited to the shift lever 2 and the parking brake lever. Also, the intermediate stop position of the guide member is not limited to a single point during forward movement but rather it may be located at a point during backward movement or at plural points, in relation to other members. It should be noted that the intermediate position of the guide member is sufficiently forward to allow a person relatively easy ingress and egress from the vehicle although not as free as in the forwardmost position.

Furthermore, in the reciprocating motion of the guide member, both forward and backward movements may be done by means of a motor or the like, or alternatively, only the forward movement may be done by means of a motor or the like and the backward movement may be done by, for example, only the winding force of the retractor or a return spring.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

I claim:

1. A passive seat belt device for a vehicle having a seat belt with both ends fixed by means to the vehicle body, at least one of said both ends being connected to a seat belt retractor means, a guide member which guides said seat belt in the longitudinal direction of the vehicle body and a drive means for driving said guide member, the loading and release of said seat belt for a person in the seat being effected by the longitudinal movement of said guide member driven by said drive means, the improvement comprising, a switch means provided for controlling the drive means and stopping the movement of said guide member at a predetermined position upon the condition that another vehicle member is interposed in the forwardly moving path of said guide member.

2. A passive seat belt device for a vehicle having a seat belt with both ends fixed by means to a vehicle body, at least one of said both ends being connected to a seat belt retractor, a guide member which guides said seat belt in the longitudinal direction of the vehicle body at a nearly central area of the vehicle body, and a drive means for driving said guide member, the loading and release of said seat belt for a person in the seat being effected by the longitudinal movement of said guide member driven by said drive means, the improvement comprising switch means for controlling the drive means whereby upon the occurrence of another vehicle member being interposed in the forwardly moving path of said guide member, the forward stop position in the forward movement of said guide member is changed to a rearer position as compared with that occupied in other than said condition.

3. A passive seat belt device according to claim 1 or claim 2, wherein said another vehicle member is a shift lever of a floor shift type transmission mechanism.

4. A passive seat belt device according to claim 1 or claim 2, wherein said guide member has a guide rail for movement therealong, and said switch means includes a limit switch mounted on said guide rail, said limit switch being adapted to be engaged with said guide member to be actuated when said guide member is in a predetermined intermediate position on said guide rail.

5. A passive seat belt device according to claim 1 or claim 2, wherein said guide member comprises a pivot shaft and a swing arm swinging pivotally about said pivot shaft in the longitudinal direction of the vehicle body, and wherein said switch means includes a limit switch disposed in close proximity to said swing arm, said limit switch being adapted to be engaged with said pivotable arm to be actuated when said pivotable arm is in a predetermined intermediate angular position.

6. A passive seat belt device according to claim 1 or 2, wherein said switch means includes a switch associated with said another vehicle member for actuation in at least one position of said member representing said condition but not in all positions of said another vehicle member and said switch means including a limit switch associated with said guide member and positioned to be actuated at an intermediate position of said guide member rearwardly of and in a non-interferring relationship with said another vehicle member under said condition.

7. A passive seat belt device for a vehicle having a seat, a central area inwardly of the seat with at least one vehicle lever located in the central area, and a door area outwardly of the seat, comprising, a seat belt having one end connected to the door area and the other end connected to the central area of the vehicle, a seat belt retractor means having one seat belt end connected thereto for automatically retracting the seat belt, a guide member and drive means therefor mounted in the central area for longitudinal movement relative to the vehicle, said guide member having means for engaging and guiding said seat belt forward and back between a foremost released position and a rearmost loaded position upon said longitudinal movement, and means for stopping the drive means and guide member at a position intermediate the foremost and rearmost positions of the guide member during said movement in the event the vehicle lever is in a position to interfere with said movement, said intermediate position of said guide member being spaced from and in a non-interfering relationship with the vehicle lever.

* * * * *